United States Patent
Wild et al.

(10) Patent No.: US 10,353,556 B2
(45) Date of Patent: Jul. 16, 2019

(54) METHOD AND DEVICE FOR PROVIDING A USER WITH FEEDBACK ON AN INPUT

(71) Applicant: VOLKSWAGEN AKTIENGESELLSCHAFT, Wolfsburg (DE)

(72) Inventors: Holger Wild, Berlin (DE); Mark Peter Czelnik, Wolfsburg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 118 days.

(21) Appl. No.: 15/111,921

(22) PCT Filed: Jan. 15, 2014

(86) PCT No.: PCT/EP2014/050674
§ 371 (c)(1),
(2) Date: Sep. 22, 2016

(87) PCT Pub. No.: WO2015/106804
PCT Pub. Date: Jul. 23, 2015

(65) Prior Publication Data
US 2017/0017378 A1    Jan. 19, 2017

(51) Int. Cl.
*G06F 3/0484* (2013.01)
*B60K 37/06* (2006.01)
(Continued)

(52) U.S. Cl.
CPC .......... *G06F 3/04845* (2013.01); *B60K 37/06* (2013.01); *B62D 15/021* (2013.01); *G06F 3/04886* (2013.01); *G06T 3/60* (2013.01); *G07C 5/0825* (2013.01); *B60K 2370/1438* (2019.05); *G06F 3/04883* (2013.01); *G06F 2203/04803* (2013.01)

(58) Field of Classification Search
None
See application file for complete search history.

(56) References Cited

U.S. PATENT DOCUMENTS 6,577,330 B1* 6/2003 Tsuda .................. G06F 3/04815
715/782
8,344,870 B2   1/2013 Evans et al.
(Continued)

FOREIGN PATENT DOCUMENTS

DE    102007039444 A1    2/2009
DE    102008050365 A1    4/2010
(Continued)

OTHER PUBLICATIONS

Korean Patent Appln. No. 10-2016-7021195. Office Action (dated Apr. 19, 2017).
(Continued)

*Primary Examiner* — Yu Chen
(74) *Attorney, Agent, or Firm* — Loza & Loza, LLP; Peter Zura

(57) ABSTRACT

A device, system and method for providing a user with feedback on an input. During use, when an input is received, the input is evaluated and classified. Depending on the determined class, an orientation of an interface of a display element (1, 2, 3, 4, 5, 6, 7, 9) displayed on a display unit (IO) is modified.

20 Claims, 3 Drawing Sheets

(51) Int. Cl.
*B62D 15/02* (2006.01)
*G06T 3/60* (2006.01)
*G07C 5/08* (2006.01)
*G06F 3/0488* (2013.01)

(56) References Cited

U.S. PATENT DOCUMENTS

| | | | | |
|---|---|---|---|---|
| 2011/0179363 A1* | 7/2011 | Dehmann | | B60K 35/00 |
| | | | | 715/764 |
| 2011/0205162 A1* | 8/2011 | Waller | | B60K 35/00 |
| | | | | 345/173 |
| 2011/0261051 A1* | 10/2011 | Meyer | | B60K 35/00 |
| | | | | 345/419 |
| 2013/0047112 A1* | 2/2013 | Waller | | B60H 1/00985 |
| | | | | 715/771 |
| 2014/0365126 A1* | 12/2014 | Vulcano | | G01C 21/36 |
| | | | | 701/533 |
| 2015/0116363 A1* | 4/2015 | Monte | | G06T 3/60 |
| | | | | 345/659 |
| 2016/0216130 A1* | 7/2016 | Abramson | | G01C 21/3626 |
| 2016/0328272 A1* | 11/2016 | Ahmed | | G06F 9/4881 |

FOREIGN PATENT DOCUMENTS

| | | | |
|---|---|---|---|
| DE | 102010011039 A1 * | 9/2011 | ......... B60H 1/00985 |
| DE | 102011116120 A | 4/2013 | |
| DE | 102011116141 A1 | 4/2013 | |
| EP | 2648086 A2 | 10/2013 | |
| KR | 10-2011-0032210 | 3/2011 | |
| KR | 10-2012-0134131 | 12/2012 | |
| KR | 10-2013-0113997 | 10/2013 | |
| WO | WO2012110021 A2 | 8/2012 | |

OTHER PUBLICATIONS

International Search Report and Written Opinion for PCT/EP2014/050674 dated Jul. 15, 2016; 5 pages.

* cited by examiner

METHOD AND DEVICE FOR PROVIDING A USER WITH FEEDBACK ON AN INPUT

RELATED APPLICATIONS

The present application claims priority under 35 U.S.C. § 371 to International PCT Application No. PCT/EP2014/050674 to Holger Wild et al., titled "Method and Device for Providing a User with Feedback On an Input" filed Jan. 15, 2014, which is incorporated by reference in its entirety herein.

TECHNICAL FIELD

The present disclosure relates to devices and methods for providing a user with feedback on an input. In particular, the present disclosure relates to a space-saving and intuitive option for providing information to a user on inputting and prompting a swipe gesture to be carried out by a user.

BACKGROUND

Modern vehicles (e.g., passenger cars, trucks, etc.) often have touch-sensitive user interfaces for optionally displaying content items of vehicle-related functional scopes. Different functional scopes are displayed, in particular, in the form of closed surface units ("tiles") as display elements. To make selections from the functional scopes that are displayed, and to increase user acceptance, the display elements, sometimes, can be rearranged by the user. For this purpose, different operating steps are provided. For users who are unfamiliar with current multimedia technologies, it is often not intuitively apparent, without studying a user manual, that there is even the option for rearranging the display elements. If users do not muster the requisite patience to study a user manual, many functions designed to improve the user experience, may remain unused.

DE 10 2007 039 444 A1 shows a method for displaying information in a motor vehicle where display elements on a display unit can be rotated from a front side to a rear side in order to get from a display panel to an operating panel of a functional unit. To this end, a rotational angle of 180° of a planar-type configured display element is provided.

DE 10 2008 050 365 A1 discloses a device for displaying information in a vehicle which turns, prior to selecting a display element displayed on a display unit, the display element from one page to another page having other information. For example, a flat object may be rotated in a perspective view by 180°.

The possibilities for providing users with feedback on an input are not exhausted to a satisfactory extent by the known measures.

Accordingly, there is a need in the art to provide users with space-saving feedback regarding an input on the surface of a display unit.

There is another need in the art to provide a playful prompt for moving display elements around that are displayed on a display unit.

There is a further need in the art to enable a better recognition of a given display element prior to rearranging the display element.

There is a still further need in the art to display the characteristics of a given driving situation clearly and playfully.

SUMMARY

According to some illustrative embodiments, the aforementioned needs may be achieved by configurations for providing users with feedback on an input, and by a corresponding device and a means of locomotion, such as a vehicle. The configurations may evaluate an input that may be, for example, a user input, which the user makes on a touch-sensitive surface of a display unit. In this example, the user may select a specific display element that is displayed on the display unit. In some illustrative embodiments, an input of an operational, situation-dependent characteristic of a vehicle may be provided. For example, physical characteristics of the operating state can be used as inputs. In particular, an acceleration or deceleration ("G-forces"), respectively, of the vehicle can be used as an input. Similarly, a motor speed of a vehicle or a sound level (e.g., of a sound-replaying device) can be used as an input. In some illustrative embodiments, the input may be classified. Here, the input may be rated in terms of as to whether a feedback should be displayed for the user to see. For example, a magnitude of one of the aforementioned inputs can be predefined as a starting value after which feedback will be provided. If the input concerns, for example, a user interaction with a graphical user interface, the action of classifying may include a position on the surface or a position within a display element displayed on the surface, respectively. Depending on the determined class, providing feedback may take the form of modifying an orientation of a surface of a display element displayed on a display unit of a vehicle. The vehicle may be a passenger car, a truck, where the central information display (CID) and/or instrument cluster is used as a display unit. The display element that is modified in terms of its orientation according to the present disclosure may be, for example, a tile representing a particular functional scope within a menu of a user interface. In this context, the display element does not necessarily have to respond to the input with respect to its primary function. Rather, in addition to its primary function, the display element may also be used to visualize the input on which feedback is to be provided under certain embodiments. By orienting the surface of the display element, the user not only receives feedback on the input, but it is also suggested to the user that the display element can be understood as a mobile unit, which can be brought (e.g., moved, dragged) to another location within the display unit. Under the present disclosure, there are many scenarios and possibilities that bring about other advantages even beyond the solutions to the tasks as mentioned above, as will be shown below.

In some illustrative embodiments, modifying the orientation may be reversed automatically after the input has been completed in response to completing the input. Thus, if there is no longer an input that is above a minimum value for triggering feedback, the display element returns to its original orientation. This can be take place, especially, in the reverse direction, wherein the motion that was performed to modify the orientation is done in reverse. This facilitates the orientation by the user on the display unit, as the end of the modification can be recognized detected intuitively.

In some illustrative embodiments, the modifying action of the orientation may include a rotation of the display element about an axis relative to the surface of the display unit. In other words, the display element may be tilted and/or pivoted to modify the orientation of its surface. In some illustrative embodiments, there is no rotation of the display element or no substantial rotation of the display element. This may provide an advantage that the content, as displayed on the display element (e.g., a text and/or a pictogram), remains largely recognizable for the user. Depending on the direction of the reorientation, the readability for the user may even improve, particularly when the user is not in a vertical line with respect to the surface of the display of the display unit. The aforementioned occurrence is often encountered in central displays of vehicles that display information in such a way that both the driver and the passenger cannot read the information from a vertical position without significantly moving away from their seated position.

A classifying action of the input may be done, for example, with respect of a given intensity of the input and/or with respect to a position of the input on the display element. Depending on the input values, it is possible to use one criterion or both criteria as a basis for the classification. The intensity of the input can be visualized, for example, in the case of inputs having substantially no reference direction. One example of such inputs is motor speed. In this example, in one scenario, the orientation of the surface of the display element can be tilted according to an accelerator pedal position about an axis that is horizontally positioned in the surface of the display unit. In one illustrative embodiment, the display element may be visually set to vibrate emulating motor vibrations at higher motor speeds, wherein the vibration can be closely related to the motor speed with respect to frequency and amplitude. However, if cornering forces of the vehicle are treated as input, a direction-dependent modification of the orientation can be executed (e.g., left turn results in a pivoting motion to the right; right turn results in a pivoting motion to the left, and the like). If a longitudinal acceleration (e.g., acceleration or braking of the vehicle) is used, the display element can, via a mechanical element suspended at its lower part, tilt by its top edge in the direction of travel during braking, and, accordingly, tilt with by top edge towards the vehicle interior in response to a strong acceleration. If a user input is confirmed as input on the display element itself (for example, by means of a touch-sensitive surface), the modifying action can be carried out as a function of the position of the input on the display element. For example, this may be carried out in such as manner as if the display element were supported with the ability to pivot or tilt, approximately in the middle of its surface. Similar to a rocker, an input by the user on a first area of the display element results in its being depressed, while a diametrically opposed area of the display element is visually quasi raised off the display plane. Here, the display element can be configured as essentially rigid or as elastic in different graduations, so as to suggest different material parameters, although all display elements are implemented in the software. For example, a tightening of the element and followed by a rapid rise up the opposing surface area can be envisioned (even accompanied by a corresponding sound output) to make the display element more vivid and more mobile. The aforementioned embodiments increase the feedback agility of the user interface and the joy of use by the user.

In some illustrative embodiments, the classification of the input may be assigned to both a degree of tilting/pivoting motion to be carried out by the display element and a direction of the tilting/pivoting motion to be carried out by the display element. In this way, a qualitative and quantitative feedback is produced in response to the input, and the use of the display unit is designed so as to be playful.

In some illustrative embodiments, display element may be, for example, a tile of a separated view on the display unit. Typically, several tiles are displayed to delineate functional units or units of meaning on a display unit. In a configuration mode, in which the tiles can be rearranged, the tiles may be supplemented with additional information to facilitate rearranging the content items by the user, as desired. In this context, the display elements, also called "tiles" in the context of the present disclosure, may be configured to have no primary assignment for providing feedback on the input. Therefore, during use, they may not specifically form a part of a functional scope of a user interface provided for displaying driving situation parameters. In this way, in some illustrative embodiments, multiple items of information may be reproduced simultaneously by means of tiles, thereby saving space on the display unit.

In some illustrative embodiments, the display element may be shown in a configuration view, and any modification of the orientation of the surface of the display elements according to the present disclosure in response to input illustrates the mobility of the display elements and therefore encourages the user to playfully interact with the configuration view. Users are therefore motivated in an intuitive and elegant way to rearrange the display elements.

In some illustrative embodiments, an input may be detected by means of a motion sensor (speed sensor) and/or an acceleration sensor and/or a position sensor and/or a steering angle sensor. The detected measured value may be determined, for example, via a communication bus of a vehicle. Depending on the equipment features of the vehicle, some or all of the above information is already present on the respective bus system anyway, which is why it is possible to utilize existing sensor systems for the generation of inputs that are useable according to the invention.

If driving situation-related inputs are used, modifying the orientation can affect a large number of display elements that are displayed on the display unit. In this context, the display elements can essentially perform identical movements. Alternately or in addition, for maintaining a natural display, the display elements can preserve movement patterns that are changed relative to each other in a predefined or (at least partially) random fashion.

If the input is provided by a user by via an operating unit, predefined subregions of a respective display element may be predefined where, when actuated by the user, a respective predefined movement pattern for modification of the orientation is used. In this way, the orientation of the display element may be carried out as a function of that position to which the user input relates. This offers the advantage that users will receive an indication as to the mobility of the display element upon actuating a display element. Moreover, they can also effect a perspective change of a representation of the display element for improving the readability of information contained therein.

According to some illustrative embodiments, a device is disclosed for providing a user with feedback on an input. The device may include a receiving unit for evaluating the input. The receiving unit may be connected, for example, to a communication bus of the vehicle. Alternatively or in addition, the receiving unit may be configured as a touch-sensitive surface of a display unit or as a device otherwise operable by a user. Of course, some or all of the inputs executed in connection with the present disclosure may be recognized and evaluated by the receiving unit of the device. In some illustrative embodiments, a display unit may be provided in the device, which is adapted for installation in a vehicle. This may include an installation by the manufacturer or by the user. For example, the display unit may be configured as a central information display (CID) and/or as a matrix display in an instrument cluster. In addition, a processing unit may be provided that includes, for example, a programmable processor (e.g., microprocessor, nanoprocessor). The processing unit may be set up to evaluate the input received by means of the receiving unit, to classify the input and to modify an orientation of a surface of a display element displayed on the display unit as a function of the determined class.

In some illustrative embodiments, a computer program product and a signal sequence are disclosed that include executable instructions, which, when read by a processing unit of a device of the invention, configure the processing unit to perform the steps of a method according to the present disclosure. In this way, instructions stored in the form of data and made available via telecommunications networks fall within the scope of protection, which, when they are executed, implement various methods according to the present disclosure.

In some illustrative embodiments, a vehicle is disclosed having at least one device performing any of the functions disclosed herein. The vehicle can be configured, for example, as a vehicle that is legally authorized for operation in street traffic (passenger car, truck, or the like). The features, combination of features and the resultant benefits are corresponding to those described herein.

The present disclosure provides configurations for providing space-saving feedback via elements (e.g., those already displayed) in order to provide information in addition to their respective primary function. These elements may be modified in their orientation for providing feedback information as a secondary function. In addition, basing the display elements on corresponding mechanical elements is a particularly intuitive form of providing feedback, which becomes apparent to the user. In addition, the perspective view created during operation by the user promotes better readability and/or detectability of the functions shown on the display elements. The use of driving state characteristics as input alerts the user, in addition, to the mobility of the display elements and is may be utilized as user training. In tests, tilting and pivoting graduations, respectively between 5° and 45°, preferably between 10° and 35°, very preferably between 15° and 25°, have proven particularly suitable for modifying the orientation of the surface of the display elements.

BRIEF DESCRIPTION OF THE DRAWINGS

Exemplary embodiments of the invention are described in detail below with reference to the accompanying drawings. In the drawings.

DETAILED DESCRIPTION

Figure 1:
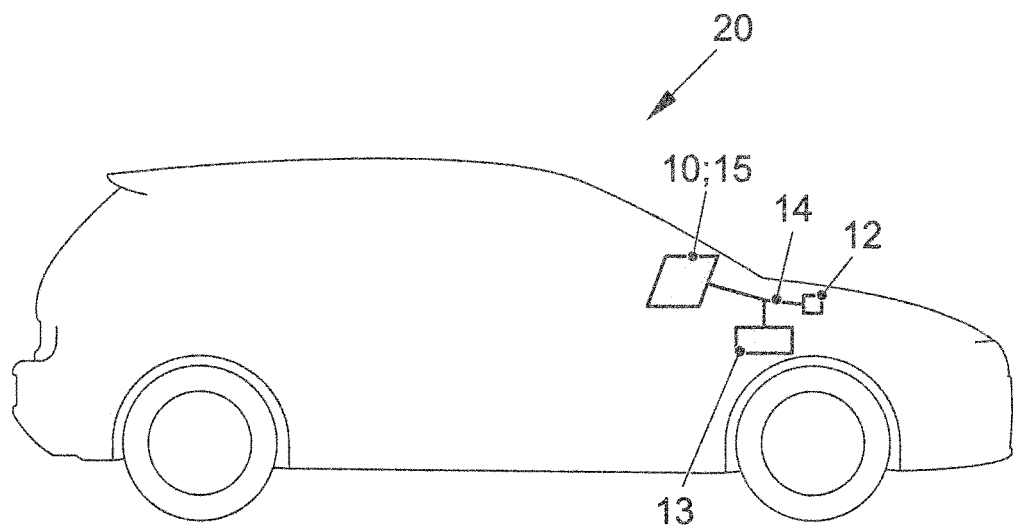
FIG. 1 is a schematic overview of the components of an exemplary embodiment of a vehicle.

FIG. 1 shows a vehicle 20 as a means of locomotion, in the dashboard of which there is disposed a display 10 as a display unit with a touch-sensitive surface 15 as part of a receiving unit. The display 10 is connected via a bus 14 to an acceleration sensor 12 as a part of a receiving unit. In addition, an electronic controller 13 as a processing unit may be operatively connected by information technology means with the aforementioned components. Just like the acceleration sensor 12, the touch-sensitive surface 15 serves as a receiving unit for inputs. Display elements displayed on display 10 are provided according to the present disclosure for providing a user with feedback on the inputs.

Figure 2:
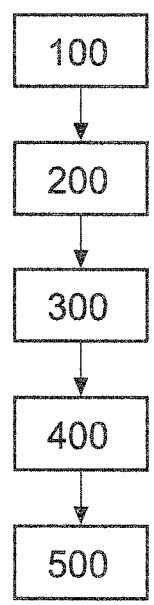
FIG. 2 is a flow chart illustrating steps of an exemplary embodiment of a method for performing some of the functions of the present disclosure.

FIG. 2 shows a flow chart illustrating steps of an exemplary embodiment of a method according to the present disclosure. An input is evaluated in step 100, wherein the input is made by a user interaction by a means of input entered via the user interface. In step 200, the input is classified as to the subregion of a surface of a display element displayed on the display unit where the user input was made. Depending on the class that is determined (subregion), an orientation of a surface of the display element displayed on the display unit is modified in step 300. This may be done in such a way that the area of the display element addressed by the user input is depressed furthest into the display level, while a subregion opposite to the centroid of the display element is displayed as raised furthest out of the display level. The positions of the remaining subregions of the display element may be modified proportionately according to a linear function in accordance with the principles of a lever so that the display element is animated as a rigid tile. In step 500, the user terminates the input by taking his hand off of the touch-sensitive surface. Accordingly, the tile flips back in the opposite direction to its starting position, so that all surface areas of the display element appear flat or parallel to the display surface.

Figure 3:
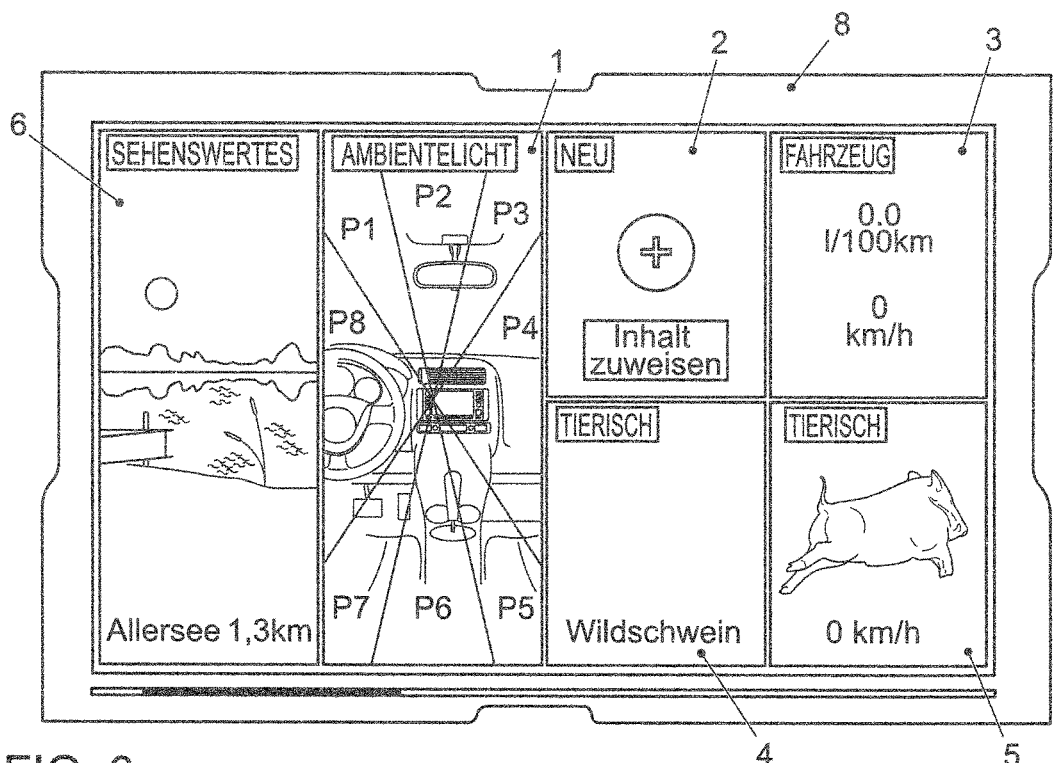
FIG. 3 is a view of a display unit under an illustrative embodiment.

FIG. 3 shows an illustrative view 8 as displayed on a display unit 10 (see FIG. 1) of several display elements in the form of tiles 1, 2, 3, 4, 5, 6. A first tile 1 is assigned to a functional area "Ambient Lighting" in this example. A second tile 2 currently has no content, which is clarified by a "+"-sign and the text "Assign Content". A third tile 3 is assigned to the on-board computer and shows current usage and speed values. A fourth tile 4 and a fifth tile 5 show information about the vegetation. While the fourth tile 4 shows the word "Boar", tile 5 shows a boar and the actual vehicle speed in a partially transparent text box display. A sixth tile 6 shows sights to see in the vicinity, as well as the location information and a current distance from this location. To illustrate individual surface areas using the first tile 1 as an example, the first tile 1 is divided into eight sectors P1, P2, P3, P4, P5, P6, P7, P8. These are arranged such that the four corners and the four side bisectors of the rectangular first tile 1 in each case are on the angle bisector between the respective boundaries of the displayed surface areas P1, P2, P3, P4, P5, P6, P7, P8. A suspension defined for modifying the orientation of the first tile 1 is arranged in the centroid of the first tile 1, where the intersection of the eight sectors P1, P2, P3, P4, P5, P6, P7, P8 is located. This point thus forms a virtual support about which the first tile 1 can pivot and tilt to modify its orientation.

Figure 4:
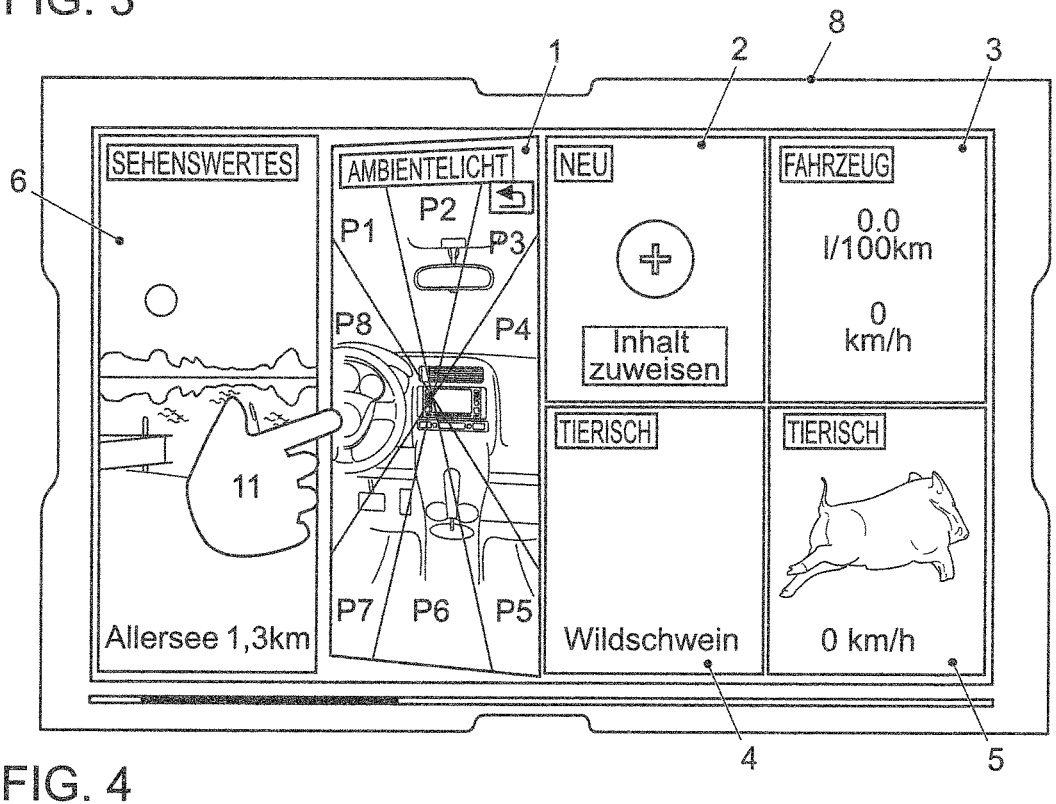
FIGS. 4 to 6 show simulated user interactions with the view shown in FIG. 3 under various illustrative embodiments.

FIG. 4 shows an operating step, which the user can execute in conjunction with the view 8 shown in FIG. 3. For this purpose, the user presses with his hand 11 on the sector marked P8 of the first tile 1. As can be seen, the entire left edge of the first tile 1 has been pressed into the display level, while the entire right edge of the first tile 1 visually protrudes from the display level. In other words, the first tile 1 has carried out a pivoting motion about an axis vertically (from bottom to top) disposed in the display level.

Figure 5:
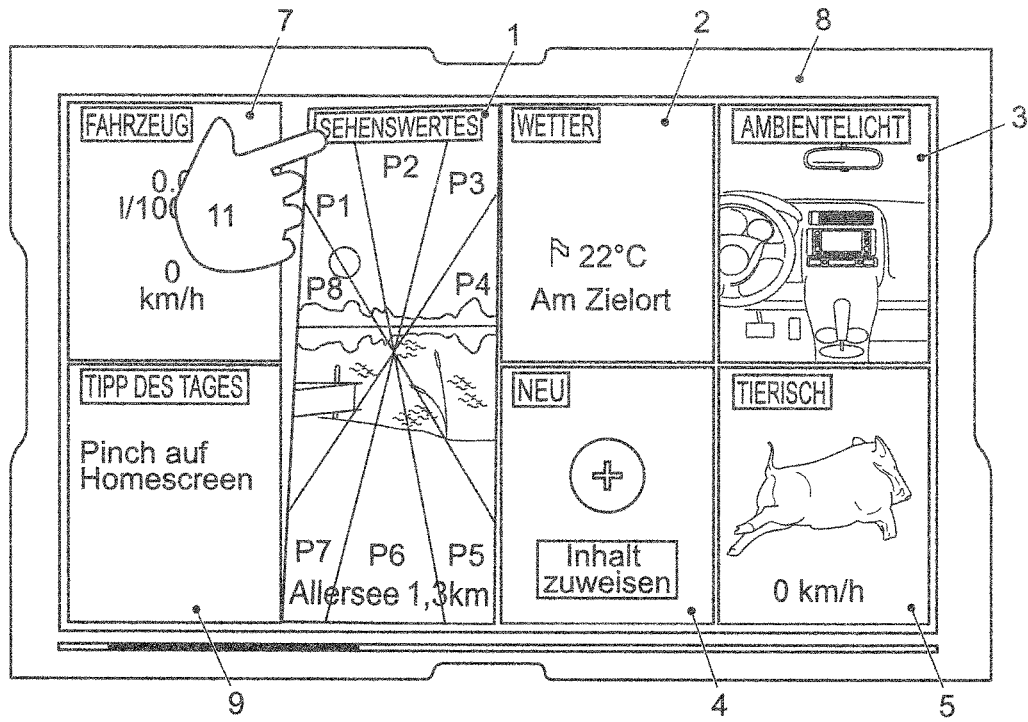

FIG. 5 shows another operating step, in which the hand 11 of the user depresses the sector marked P1 in the first tile 1. Accordingly, the first tile 1 simultaneously carried out a tilting motion about an axis horizontally disposed in the display level and a pivoting motion about an axis vertically disposed in the display level (corresponding to the operating step shown in FIG. 4). The lower right corner of the first tile 1 now stands out alone as the furthest from the display level. User interactions, not shown, have previously changed the information shown on the first tile 1 from "Ambient Lighting" to "Sightseeing". In addition, the former sixth tile 6 has been exchanged for a seventh tile 7 on which is now displayed the information previously shown on the third tile 3, and an eighth tile 9, on which a "Tip of the Day" is displayed. While the second tile 2 is now displaying weather information, the content of the fourth tile 4 has been deleted. The information of the ambient lighting is now displayed on the third tile 3.

Figure 6:
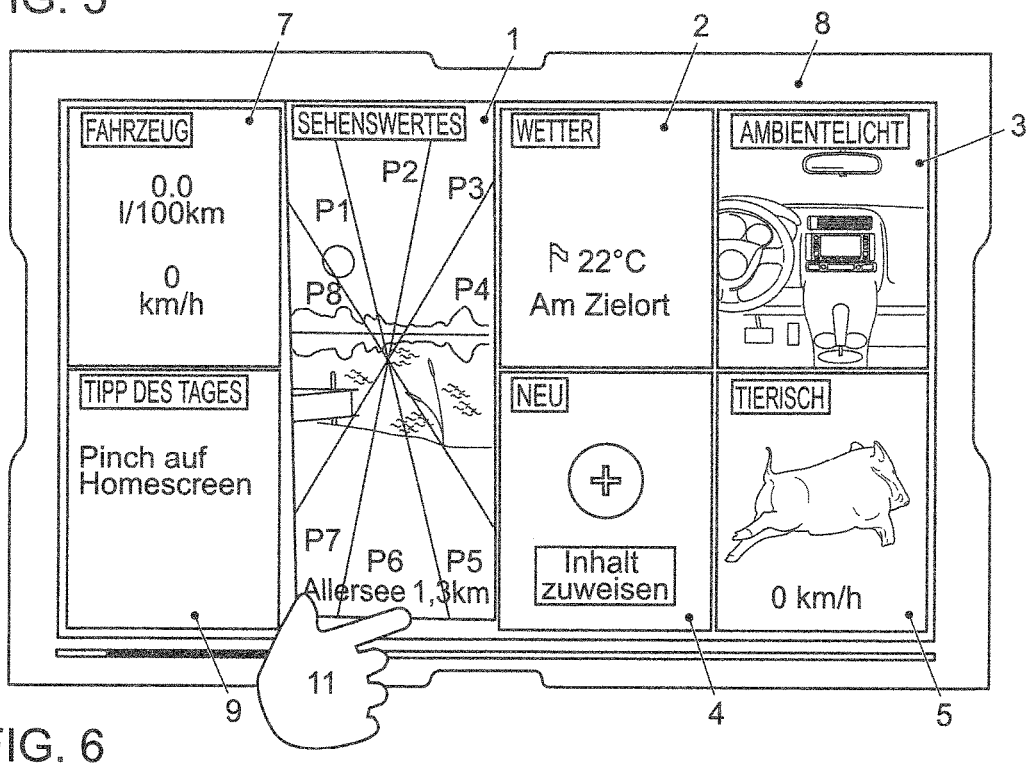

FIG. 6 shows a third possible input step in conjunction with the displayed view 8, in which the hand 11 of the user depresses the section marked P6 of the first tile 1. Accordingly, the first tile 1 performs a tilting motion about an axis horizontally disposed in the display level, wherein the lower edge of the first tile 1 is pushed furthest into the display level, and the upper edge of the first tile 1 is pushed out furthest of the display level.

Although the aspects of the present disclosure and advantageous embodiments have been described in detail by way of the illustrative embodiments and with reference to the accompanying figures in the drawings, modifications and combinations of features of the illustrated embodiments are apparent to persons skilled in the art without departing from the field of the present invention, the scope of which is defined by the appended claims.

LIST OF REFERENCE NUMERALS

1 first tile
2 second tile
3 third tile
4 fourth tile
5 fifth tile
6 sixth tile
7 seventh tile
8 view
9 eighth tile
10 display
11 the user's hand
12 acceleration sensor
13 electronic controller
14 bus
15 touch-sensitive surface
20 vehicle
100-500 process steps
P1-P8 sections of the first tile

The invention claimed is:

1. A method for providing feedback on a vehicle display unit of a vehicle, comprising:
displaying content in a region of a surface the vehicle display unit, wherein the content comprises a plurality of static display elements in different subregions of the content, wherein at least one of the display elements is configured to visually represent in the subregion at least one of a vehicle function and/or vehicle data;
receiving an input comprising one of (i) an operational characteristic of locomotion of the vehicle and (ii) a variable-intensity user input for a selected display element;
processing the input via a processor to determine a classification indicating a characteristic of the input; and
modifying an orientation of the display element in the subregion of the vehicle display unit relative to the content based on the determined classification.

2. The method of claim 1, further comprising performing another modification of the orientation of the display element after the input is no longer received.

3. The method of claim 1, wherein the modifying of the orientation of the display element comprises rotating the display element about an axis disposed in a surface of the display unit.

4. The method of claim 1, wherein determining the classification of the input comprises determining at least one of (i) an intensity of the input and/or (ii) a position of the input on the display element.

5. The method of claim 1, wherein the display element comprises a graphical tile of a configuration mode of the vehicle display unit, and wherein the modifying of the orientation of the display element does not affect a functional scope of the tile.

6. The method of claim 1, wherein receiving the input comprises determining a measured value detected by one of (i) a motion sensor, (ii) acceleration sensor, (iii) position sensor or (iv) steering angle sensor.

7. The method of claim 1, wherein receiving an input for the display element on the vehicle display unit comprises receiving an input on an operating unit associated with the display unit.

8. The method of claim 1, further comprising
assigning a position of the input from a plurality of positions of the display element, wherein modifying the orientation of the display comprises modifying the orientation as a function of the assigned position.

9. A device for providing feedback on a vehicle display unit of a vehicle, the vehicle display unit being configured to display content in a region of a surface the vehicle display unit, wherein the content comprises a plurality of static display elements in different subregions of the content, wherein at least one of the display elements is configured to visually represent in the subregion at least one of a vehicle function and/or vehicle data, the device comprising:
a receiving unit operatively coupled to the vehicle display unit for receiving an input comprising one of (i) an operational characteristic of locomotion of the vehicle and (ii) a variable-intensity user input for a selected display element;
a processing unit, operatively coupled to the receiving unit, wherein the processing unit is configured to process the input to determine a classification indicating a characteristic of the input, and modify an orientation of the display element in the subregion of the vehicle display unit relative to the content based on the determined classification.

10. The device of claim 9, wherein the processing device is configured to perform another modification of the orientation of the display element after the input is no longer received.

11. The device of claim 9, wherein the processing device is configured to modify of the orientation of the display element by rotating the display element about an axis disposed in a surface of the display unit.

12. The device of claim 9, wherein the processing device is configured to determine the classification of the input by determining at least one of (i) an intensity of the input and/or (ii) a position of the input on the display element.

13. The device of claim 9, wherein the vehicle display element comprises a graphical tile of a configuration mode of the vehicle display unit, and wherein the processing device is configured to modify the orientation of the display element without affecting a functional scope of the tile.

14. The device of claim 9, wherein the receiving unit is configured to receive the input by determining a measured value detected by one of (i) a motion sensor, (ii) acceleration sensor, (iii) position sensor or (iv) steering angle sensor.

15. The device of claim 9, wherein the processing device is configured to assign a position of the input from a plurality of positions of the display element, and further configured to modify the orientation of the display by modifying the orientation as a function of the assigned position.

16. A device for providing feedback on a vehicle display unit of a vehicle, the vehicle display unit being configured to display content in a region of a surface the vehicle display unit, wherein the content comprises a plurality of static display elements in different subregions of the content, wherein at least one of the display elements is configured to visually represent in the subregion at least one of a vehicle function and/or vehicle data, the device comprising:

a receiving unit comprising an operating unit operatively coupled to the vehicle display unit, the receiving unit configured to receive an input comprising one of (i) an operational characteristic of locomotion of the vehicle and (ii) a variable-intensity user input for a selected display element;

a processing unit, operatively coupled to the receiving unit, wherein the processing unit is configured to process the input to determine a classification for the input based on at least one of (i) an intensity of the input and/or (ii) a position of the input on the display element, wherein the processing unit is configured to modify an orientation of the display element in the subregion of the vehicle display unit relative to the content based on the determined classification.

17. The device of claim 16, wherein the processing device is configured to perform another modification of the orientation of the display element after the input is no longer received.

18. The device of claim 16, wherein the processing device is configured to modify of the orientation of the display element by rotating the display element about an axis disposed in a surface of the display unit.

19. The device of claim 16, wherein the vehicle display element comprises a graphical tile of a configuration mode of the vehicle display unit, and wherein the processing device is configured to modify the orientation of the display element without affecting a functional scope of the tile.

20. The device of claim 16, wherein the receiving unit is configured to receive the input by determining a measured value detected by one of (i) a motion sensor, (ii) acceleration sensor, (iii) position sensor or (iv) steering angle sensor.

* * * * *